United States Patent [19]

Hare

[11] 4,377,215
[45] Mar. 22, 1983

[54] SUSPENSION SYSTEM FOR AUTOMOTIVE VEHICLES

[76] Inventor: Terence G. Hare, 21146 Caberfae Hwy. M-55, Wellston, Mich. 49689

[21] Appl. No.: 294,443

[22] Filed: Aug. 20, 1981

Related U.S. Application Data

[63] Continuation of Ser. No. 126,570, Mar. 3, 1980, abandoned.

[51] Int. Cl.³ .............................................. B62D 61/00
[52] U.S. Cl. ................................ 180/21; 280/112 A; 280/772
[58] Field of Search ................... 180/210, 21; 280/772, 280/112 A, 112 R, 110, 109, 712, 269

[56] References Cited

U.S. PATENT DOCUMENTS

| | | | |
|---|---|---|---|
| 2,279,120 | 4/1942 | Hurley | 280/112 A |
| 2,383,611 | 8/1945 | Marcy | 180/210 |
| 3,285,617 | 11/1966 | Jackson | 280/712 |
| 4,132,435 | 1/1979 | Wilson | 280/772 |
| 4,159,128 | 6/1979 | Blaine | 280/772 |

FOREIGN PATENT DOCUMENTS

| | | | |
|---|---|---|---|
| 507919 | 9/1920 | France | 180/21 |
| 470391 | 4/1952 | Italy | 280/110 |

Primary Examiner—John A. Pekar
Attorney, Agent, or Firm—Barnes, Kisselle, Raisch, Choate, Whittemore & Hulbert

[57] ABSTRACT

A suspension system for a vehicle comprising a frame, a load area on the frame, an engine mounted intermediate the front and rear ends of the frame. Closely spaced rear wheels are resiliently mounted at the rear of the frame. A front axle supports steerable front wheels and the front axle is resiliently mounted on the frame for movement vertically and horizontally. The mechanism is interconnected with the front axle such that when the steering is actuated, the frame is caused to tilt in the direction of the turn.

12 Claims, 10 Drawing Figures

4,377,215

SUSPENSION SYSTEM FOR AUTOMOTIVE VEHICLES

This is a continuation of application Ser. No. 126,570, filed Mar. 3, 1980, now abandoned.

This invention relates to automotive vehicle suspension systems.

BACKGROUND AND SUMMARY OF THE INVENTION

In automotive vehicles, a major safety problem is the tendency of the body and frame vehicle to turn away from the direction of turn.

Accordingly the present invention is directed to a suspension system which causes the frame to turn into the turn resulting in greater safety.

DESCRIPTION

Figure 1:
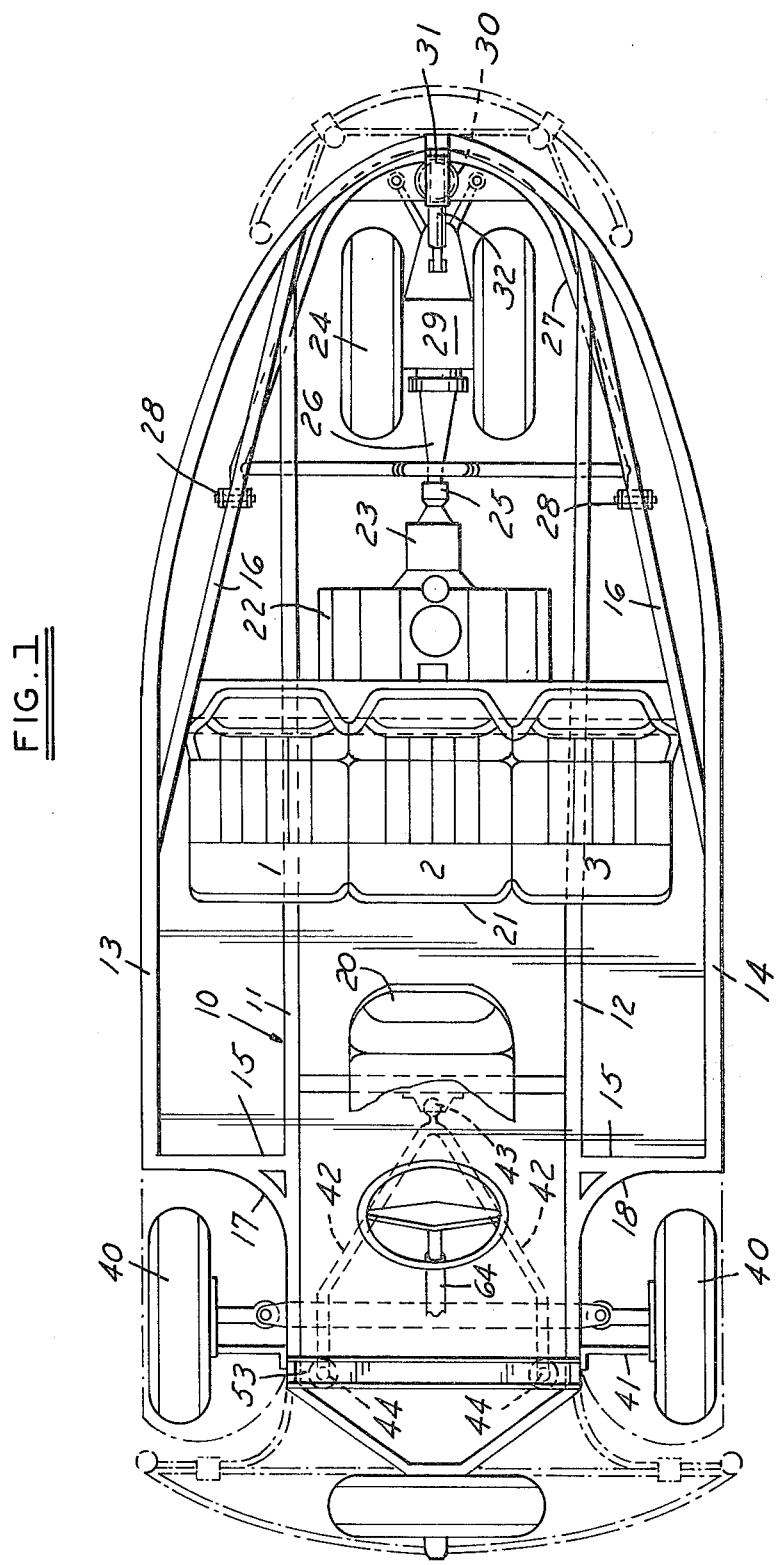
FIG. 1 is a plan view of a vehicle embodying the invention.
Figure 2:
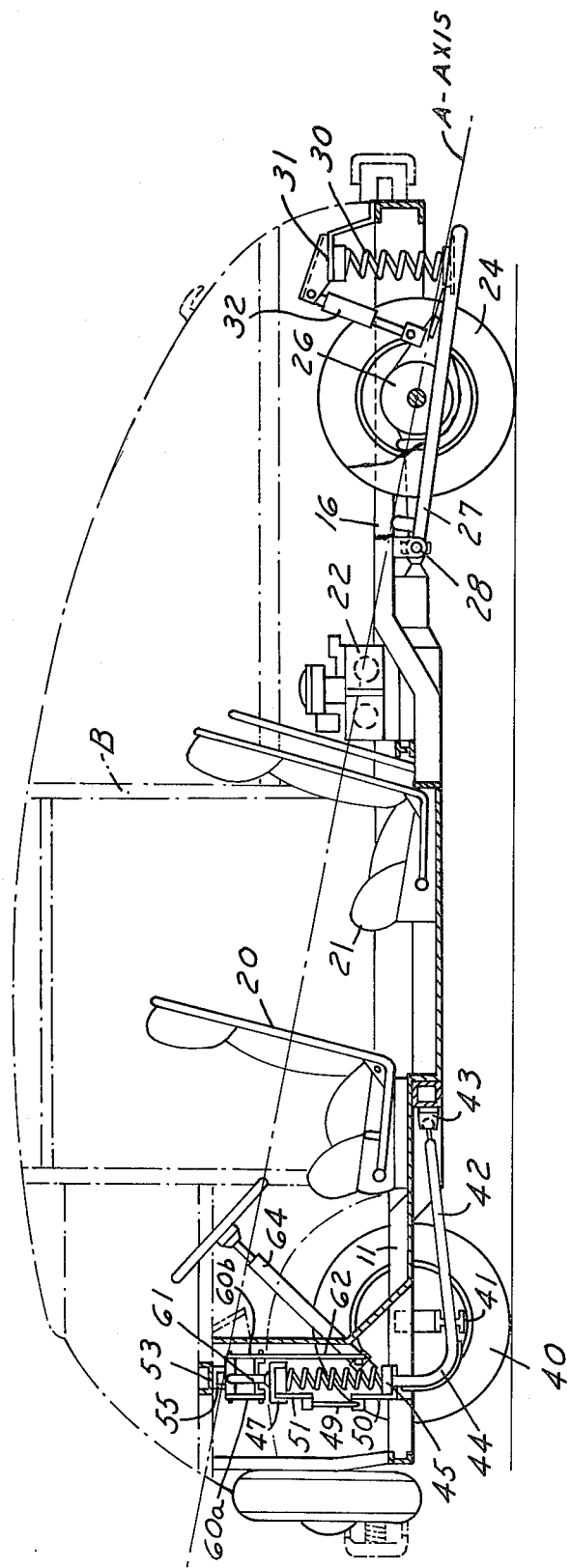
FIG. 2 is an elevational view of the same.

Referring to FIGS. 1 and 2, the automobile embodying the invention comprises a frame 10 comprising internal channels 11, 12 extending throughout the length of the frame and external channels 13, 14 spaced rearwardly from the front end of the frame by cross channels 15. Each outer channel 13, 14 is curved inwardly and joined to the other at the rear of the vehicle. Straight reinforcing channels 16 extend across the arc of curvature to strengthen the curved portion and provide a resistance to impact. Inwardly curved channels 17, 18 define the front wheel areas.

The driver's seat 20 is supported on the frame intermediate the rails 11, 12. The passenger seats 21 are provided on the frame behind the driver's seat and in front of the engine 22 that is supported on the frame generally intermediate the front and rear of the frame. The engine 22 and integral transmission 23 are supported on the frame by rubber mounts.

The drive to the rear wheels 24 is through a conventional universal joint 25 on the transmission 23 and torque tube 26 through a bevel gear (not shown) to the rear axle.

As shown in FIGS. 1, 2, 8 and 9, an A-frame 27 is pivoted at the forward ends of its arms at pivot points 28 on the frame and the axle housing 29 is fastened on the A-frame. A spring 30 is interposed between a frame bracket 31 and the A-frame 27 and a shock absorber 32 extends between the bracket 31 and the axle housing 28 to provide a shock absorbing function.

Each front wheel 40 is mounted by a knuckle of conventional construction (not shown) to an axle 41. The axle 41 is universally mounted to the main frame 10 by radius rods 42 having their ends joined to one another and connected to the frame by ball joint 43. The radius rods 42 extend forwardly and downwardly and are fixed to the axle 41. Portions 44 extend upwardly in front of the axle 41.

A cup 45 is mounted on the upper end of each portion 44 and receives the lower end of a coil spring 46. A connecting bar 47 has downwardly facing cups 48 at each end for receiving the upper ends of the respective springs 46. A stabilizer bar 49 connects one of the lower cups 45 with the opposed upper cup 48. The stabilizer bar 49 is connected to brackets 50, 51 by spring-loaded ball joints.

Figure 7:
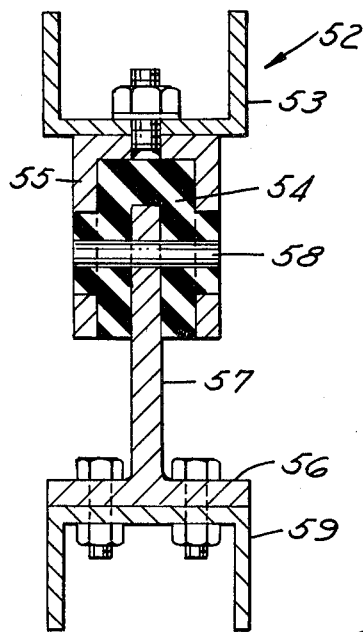
FIG. 7 is a sectional view taken along the line 7—7 in FIG. 3.
Figure 8:
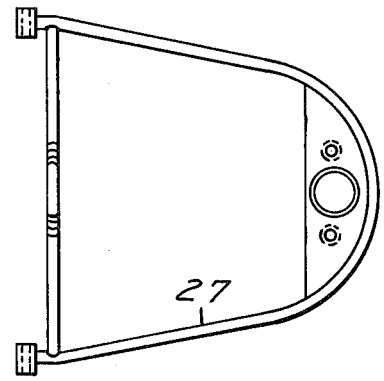
FIG. 8 is a plan view of a portion of the rear suspension.
Figure 9:
FIG. 9 is an elevational view of the same.
Figure 10:
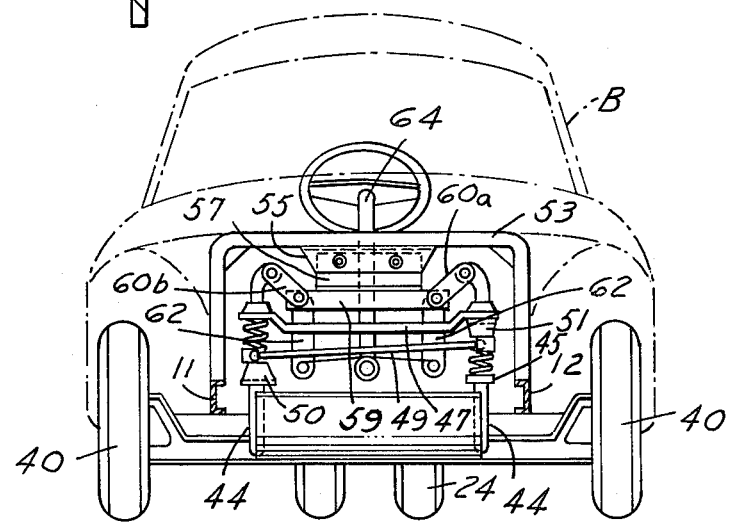
FIG. 10 is a front elevational view of a vehicle embodying the suspension system.

A suspension support frame 52 in the form of a channel extends from the inner frame members 11, 12 and has a horizontal portion 53 extending transversely above the connecting bar 47. A block 54 of rubber or other similar resilient material is mounted within an inverted channel 55 that, in turn, is fixed on the underside of the horizontal portion 53 (FIG. 7). A suspension support 56 having an I shaped cross section has the vertical portion 57 thereof embedded in the resilient block 54. In order to provide a bond connection, the vertical portion 57 includes openings through which rubber with an embedded steel pin extend so that if the rubber bond fails, the pin will retain the assembly. A cross channel member 59 is, in turn, fastened to the horizontal portion of the suspension support 56. Shackle arms 60 are pivoted to cross channel member 59 and have their upper ends connected to a shackle connector 61 extending upwardly and transversely inwardly from the connecting bar 47.

One of the connector bars 60 extends downwardly on each end. The lower ends of the ends 62 are connected by a flexible connector 63 such as a cable or chain to the steering column 64 by having the flexible member 63 wrapped around a pulley or sprocket 65. The lower end of the steering column 64 is connected to the conventional steering gearbox for turning the wheels.

Figures 4, 5:
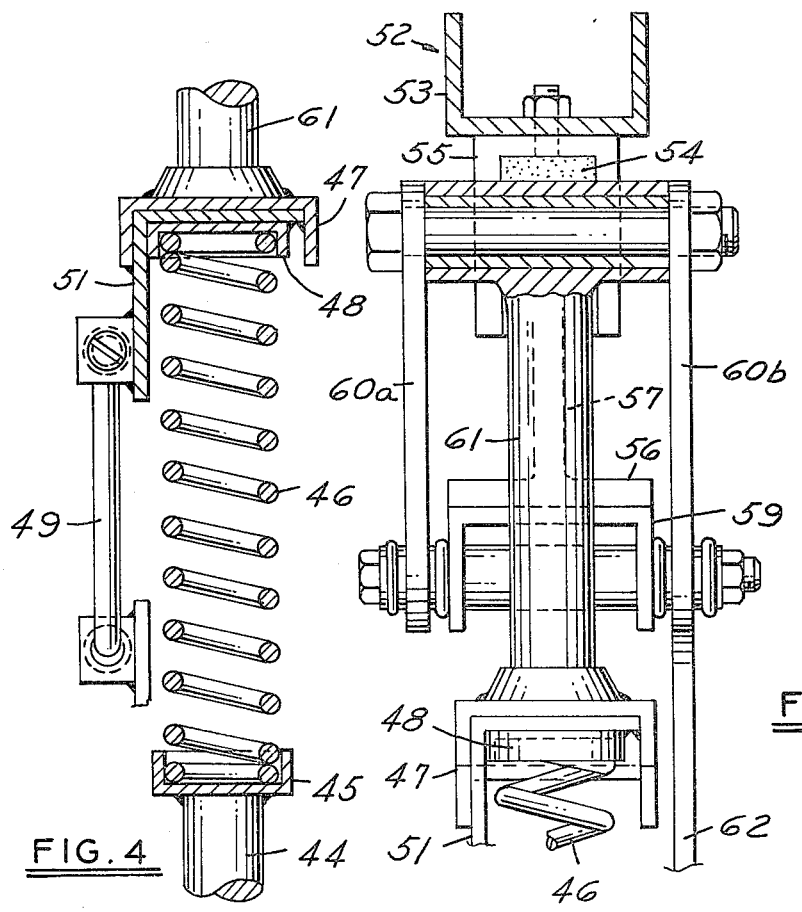
FIG. 4 is a fragmentary sectional view through a portion of the system.
FIG. 5 is a fragmentary sectional view taken along the line 5—5 in FIG. 3.

As shown in FIG. 2, an axis A extends from the center of connecting bar 59 (FIG. 5) downwardly and rearwardly and intersects the axis of rotation of the rear wheels when the vehicle is at rest. The location of the seats 20, 21 and the engine 22 of the frame is such that the major portion of the load of the passengers, frame and the engine weight is below the axis A. The body B is mounted on the frame which frame has the major portion thereof below the axis A. As a result, the major portion of the body weight is below the axis A.

When the automobile moves along a highway and the steering column 64 is rotated to turn the wheels, the aforementioned construction causes the frame and body to lean into the curve or turn rather than in the opposite direction as occurs in conventional automobiles.

Figure 3:
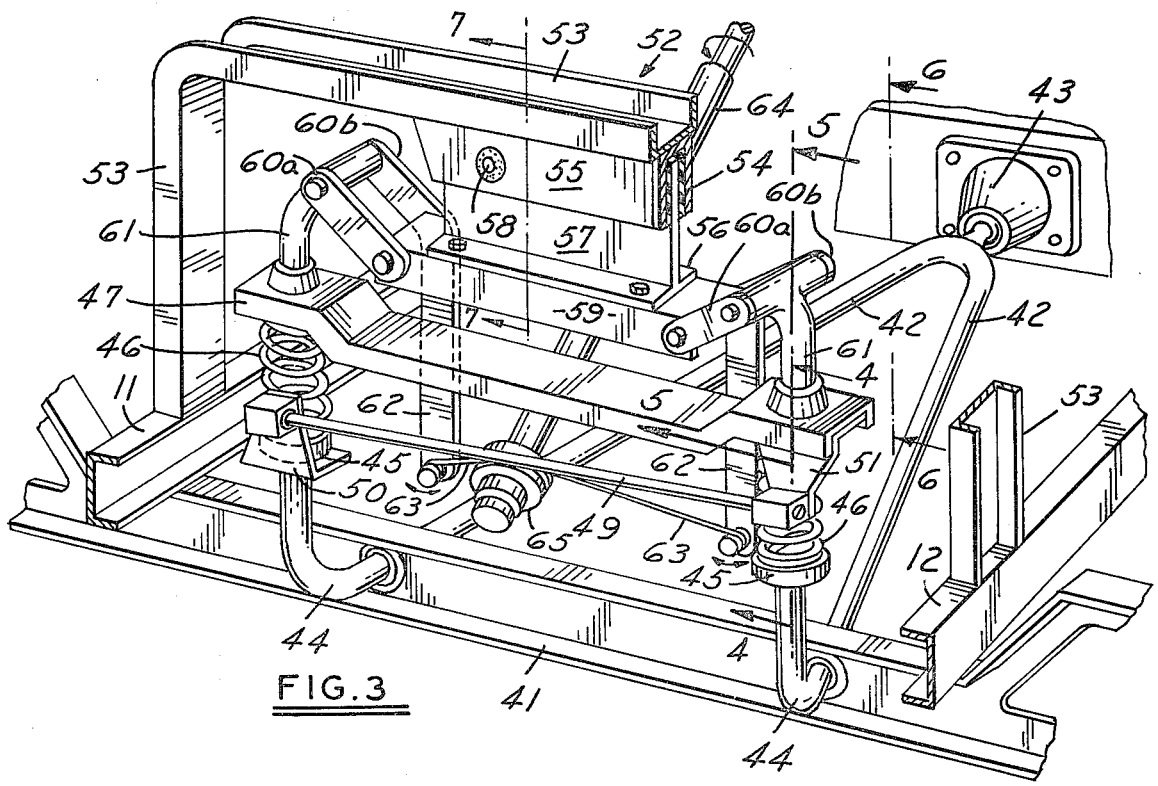
FIG. 3 is a fragmentary perspective view of the front portion of the suspension system.

For example, referring to FIG. 3, when the steering column 64 is rotated in the direction of the arrow for a right turn, the lower end of the shackle 60 on the right will move downwardly and to the right as shown by the arrow on the left and the lower end of the shackle 60 on the left will move upwardly and to the right as shown in FIG. 3. As a result, the frame and, in turn, the body is tilted to the right, that is, the right hand portion leans inwardly and the left hand portion leans upwardly.

Figure 6:
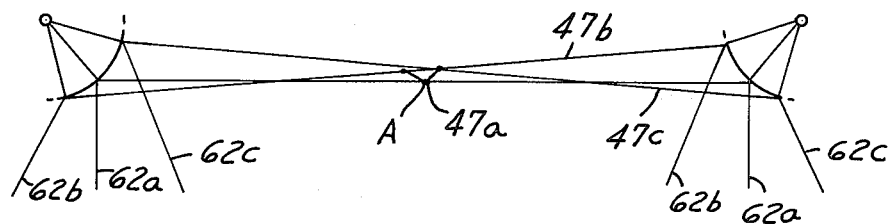
FIG. 6 is a diagram of the frame motion.

Referring to FIG. 6, the manner in which the construction functions to cause tilting of the frame is shown diagrammatically. Position 62a indicates the portion of the shackle members 60 before a turn. When the steering column is rotated for a right turn, the shackles move to positions indicated as 62b whereas when the steering column is turned in the opposite direction, the shackles move to positions 62c.

As a result, the connecting bar moves to respective positions 47a, 47b or 47c. Since the connecting bar 47 is connected by the resilient mount to the frame through the channel portion 53, the automobile body is, in turn, tilted in the desired manner into the turn rather than away from the turn.

As can be seen from FIG. 6, because the connecting member 47 shifts laterally, the front end of the axis A also shifts to the respective positions 47a, 47b and 47c.

I claim:
1. A vehicle comprising
a frame having a front end and rear end,
a load area on said frame,
an engine mounted intermediate the front and rear ends of said frame,
closely spaced rear wheels resiliently mounted at the rear of said frame at a spacing less than the width of the frame,
a front axle,
steerable front wheels on said axle,
means for universally mounting said front axle on said frame for movement vertically and horizontally,
resilient means between said frame and said front axle,
a steering column rotatably mounted on said frame,
the position of the load, frame and engine being such that the majority of the weight of the load, frame and engine lies below an axis extending from the resilient means and intersecting the axis of rotation of the rear wheels when the vehicle is at rest,
and means interconnecting said steering column and said front axle such that when said column is rotated, the frame is caused to tilt in the direction of the turn.

2. The vehicle set forth in claim 1 wherein said means for mounting said front axle on said frame comprises ball and socket joint means rearwardly of said front axle connected to said frame and said front axle.

3. The vehicle set forth in claim 2 wherein said means interconnecting said steering column and said front axle for causing said frame to tilt into a turn comprises a cross bar, spring means between said axle and cross bar, a suspension support overlying said cross bar, means resiliently connecting said suspension support to said frame, spaced shackle arms pivoted to said suspension support at one end and to said cross bar at the other end, each said shackle arm having a free end portion extending downwardly, and flexible means connected to said free end portions and operable by operation of the steering column to swing said shackle arms to cause tilting of said frame in the direction of a turn.

4. The vehicle set forth in claim 3 wherein said means mounting said front axle includes radius rods having one end extending to said ball and socket means, and the other ends fastened to said front axle and extending upwardly to support said spring means.

5. The vehicle set forth in claim 4 including a tie rod extending transversely between the other end of one tie rod and the end of said cross bar overlying the other end of said other tie rod.

6. The vehicle set forth in claim 3 wherein said means resiliently connecting said suspension support to said frame comprises a portion of the frame overlying said suspension support and resilient block means interconnecting said frame portion and said suspension support.

7. The vehicle set forth in claim 1 including an A-frame having spaced arms pivoted at their free ends to said frame and extending rearwardly, said A-frame supporting said rear wheels, and spring and shock absorbing means extending between said A-frame and said frame to resiliently support said rear wheels on said first-mentioned frame.

8. A vehicle comprising
a frame having a front end and a rear end,
a load area on said frame,
an engine mounted intermediate the front and rear ends of said frame,
closely spaced rear wheels resiliently mounted at the rear of said frame at a spacing less than the width of the frame,
a front axle,
steerable front wheels on said axle,
means for universally mounting said front axle on said frame for movement vertically and horizontally,
resilient means between said frame and front axle,
a steering column rotatably mounted on said frame,
means interconnecting said steering column and said front axle for causing said frame to tilt into a turn comprising a cross bar, spring means between said axle and cross bar, a suspension support overlying said cross bar, means resiliently connecting said suspension support to said frame, spaced shackle arms pivoted to said suspension support at one end and to said cross bar at the other end, each said shackle arm having a free end portion extending downwardly and flexible means connected to said free end portions and operable by operation of the steering column to swing said shackle arms to cause tilting of said frame in the direction of a turn.

9. The vehicle set forth in claim 8 wherein said means mounting said front axle includes radius rods having one end extending to ball and socket means, and the other end fastened to said front axle and extending upwardly to support said spring means.

10. The vehicle set forth in claim 9 including a tie rod extending transversely between the other end of one tie rod and the end of said cross bar overlying the other end of said other tie rod.

11. The vehicle set forth in claim 8 wherein said means resiliently connecting said suspension support to said frame comprises a portion of the frame overlying said suspension support and resilient block means interconnecting said frame portion and said suspension support.

12. A vehicle comprising
a frame having a front end and a rear end,
a load area on said frame,
an engine mounted intermediate the front and rear ends of said frame and having a transmission,
a front axle,
steerable front wheels on said axle,
means for universally mounting said front axle on said frame for movement vertically and horizontally,
resilient means between said frame and axle,
an A-frame having spaced arms with the free ends of said arms pivoted to said frame and extending rearwardly, rear wheels, said A-frame supporting said rear wheels, and spring and shock absorbing means extending between said A-frame and said frame to resiliently support said A-frame on said first-mentioned frame,
a universal joint extending from said transmission and drive means from said transmission to said rear wheels,
the pivots of said arms to said A-frame and said universal joint being in alignment.

* * * * *